UNITED STATES PATENT OFFICE.

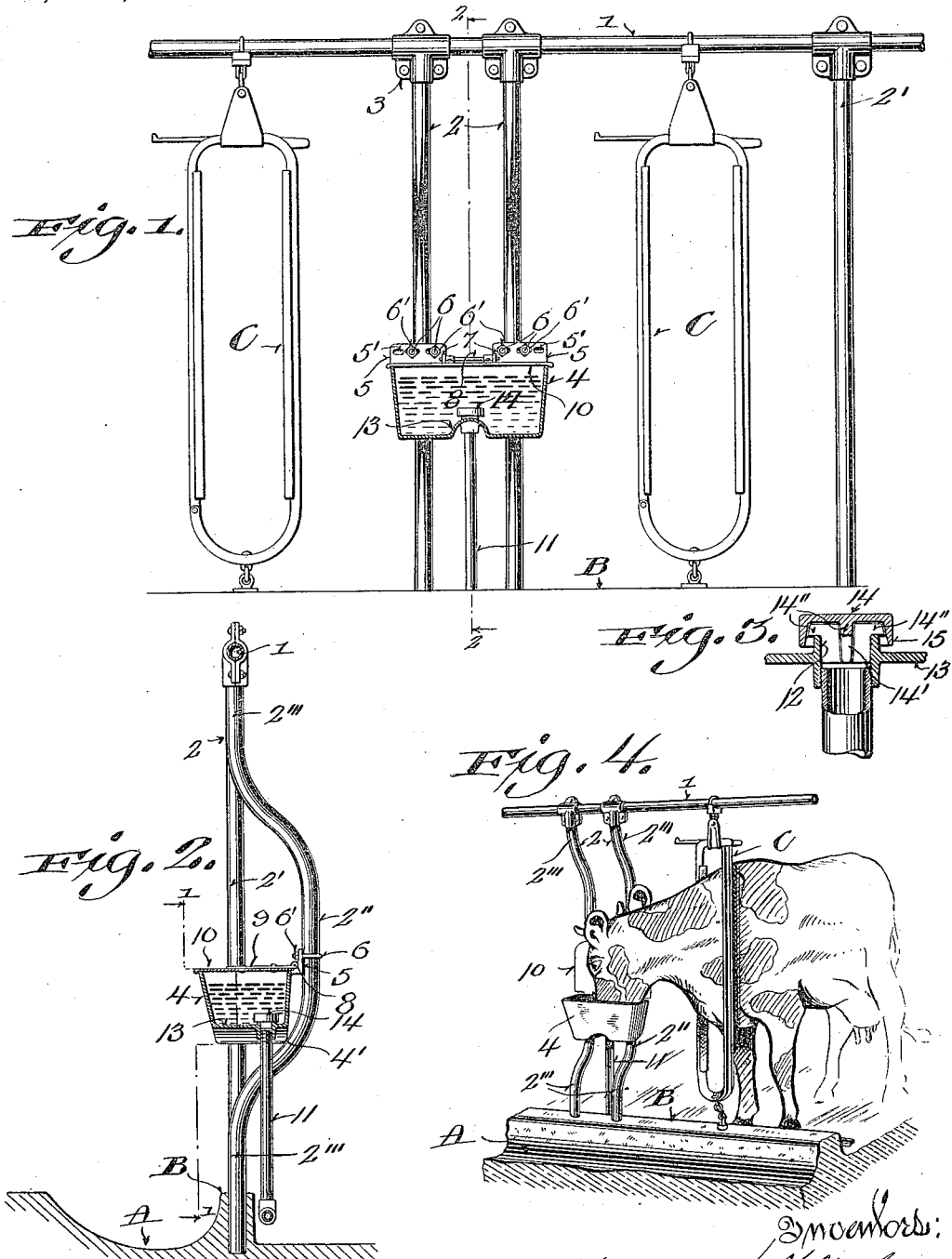

FREDERICK W. MOLDENHAUER, OF OCONOMOWOC, AND SIDNEY E. JONES, OF HUSTISFORD, WISCONSIN, ASSIGNORS TO WISCONSIN STABLE EQUIPMENT COMPANY, OF OCONOMOWOC, WISCONSIN.

STALL EQUIPMENT.

1,154,715.  Specification of Letters Patent.  Patented Sept. 28, 1915.

Application filed October 29, 1914. Serial No. 869,192.

*To all whom it may concern:*

Be it known that we, FREDERICK W. MOLDENHAUER and SIDNEY E. JONES, both citizens of the United States, and residents of Oconomowoc, in the county of Waukesha and State of Wisconsin, and of Hustisford, in the county of Dodge and State of Wisconsin, respectively, have invented certain new and useful Improvements in Stall Equipment, and we do hereby declare that the following is a full, clear, and exact description thereof.

Our invention refers to stable equipment especially designed for milch cows, its object being to provide simple, economical, convenient and effective drinking cups in connection with a series of stanchions.

Specific objects of our invention are to provide a drinking cup positioned above and rearwardly of the manger and to one side of a stanchion, whereby the cup is located in such manner that the manger is clear of the obstruction, while at the same time the cup is conveniently accessible for the animals; to provide a cup so positioned between a pair of stanchions, whereby companion animals can utilize a single vessel; to provide a post that is intermediately bowed in a rearward direction for the support of the cup, whereby said post is positioned so as to avoid obstructing access to the cup from either side, it being understood that the animals are so shackled that their heads are free to swing to one side or the other; to provide a clip mechanism in connection with the cup, whereby it can be conveniently adjusted and secured to supporting posts, which posts also constitute frame elements for the support of the stanchions.

With the above and other minor objects in view the invention consists in what is hereinafter described with reference to the accompanying drawings and subsequently claimed.

In the drawings Figure 1 represents a front elevation of a stall equipment embodying the features of our invention with parts broken away and parts in section, as indicated by line 1—1 of Fig. 2; Fig. 2, a longitudinal sectional view of the same, the section being indicated by line 2—2 of Fig. 1; Fig. 3, a detailed sectional view upon an enlarged scale showing the construction of the water delivery mouth with which the cup is provided, and Fig. 4, a perspective view of a single unit of the stall equipment illustrating the position an animal assumes when drinking from the conveniently located cup.

Heretofore it has been the practice to provide drinking cups of various types for stall equipment, but the position of such cups is such that, in order to be accessible for drinking purposes, they are projected over the manger trough and thus form obstructions which seriously interfere with feeding and the placing of such feed in the manger. Their position also causes them to become clogged with the feed carelessly distributed about. Should the cups be placed within the stall or rearwardly of the manger sill, under ordinary conditions, their supporting means becomes an obstruction whereby the cups are not accessible and thus said cups also utilize space which, under ordinary conditions, is primarily provided for free movement of the animals. By constructing a cup and supporting the same in accordance with our invention, the supports being so bowed not only serve to maintain the cups in the position desired, but they form fenders to prevent injury caused through coming in contact with the sharp angles upon such drinking cups. Furthermore, by bowing the supports rearwardly as will be hereinafter described, the upper bowed section, which extends back of the line of stanchions, will permit the animal to swing its neck and head freely toward the trough and assume a natural position in drinking.

Referring by characters to the drawings, A represents a manger and B the manger sill or head beam of a series of stalls. Alined with the manger sill is an overhead stanchion supporting bar 1, which bar is maintained by a series of upright posts 2, 2, 2'. Mounted between one of each pair of posts 2 and the supporting post 2' is a stanchion C of any desired type, the said stanchion members being suspended from the bar and anchored to the sill by suitable clip mechanisms which form no part of our invention.

As best shown in Fig. 2, the posts 2' are straight and alternate companion pairs of the posts 2, whereby the division between the stalls is had, but, it is understood that we may, without departing from the spirit of our invention, use only a single post 2 in some instances. It should also be understood that all of the posts are anchored in any suitable manner at their lower ends to the sill B and fastened by clips 3 or other mechanism to the overhead supporting bar 1. The companion posts 2 form supports for a cup 4, which cup is positioned rearwardly of the manger and between companion stanchion members. In order to support the cup in this position the posts 2 are provided with intermediate rearwardly positioned bowed sections 2″ which are merged into upper and lower straight sections 2‴ by ogee curves, as shown. Hence the bottom corners 4′ of the cups 4, as shown in Fig. 2, are arranged to rest upon the ogee curved portions of the companion posts 2. The cups are each provided with ears 5 that project from their upper edges, which ears are formed with horizontally disposed slots 5′ for the reception of clip bolts 6, the same being fitted about the bowed portion 2″ of the posts. These clips are suitably confined by nuts 6′, as shown, which engage the threaded ends of the clips and abut the outer faces of the ears. The ears 5 are also formed with apertured lugs 7 for the reception of a pintle rod, which rod passes through straps 9 of a lid 10, the said lid serving to close the cup when not in use and when it is desired to utilize the cups, it is obvious that the lid can be swung upwardly and maintain its open position by engagement of its outer edge with the offset portion 2 of the companion posts, which engagement takes place after the lid has been swung back of a vertical line intersecting its pivot. Thus the lid, when opened, also forms a backboard or guard for the cup and, owing to the fact that the animal must swing its head toward the offset portion 2″ of the posts, there is no liability of the lid being inadvertently closed.

Water is supplied to the cup through a pipe 11 from any suitable source of supply, the said pipe being in threaded union with a mouth nipple 12 that is formed at the apex of a crowned portion 13 of the cup bottom. The mouth nipple is adapted to receive a hood cap 14 having cross flanges 14′ that are adapted to enter the mouth nipple. These flanges are formed with arms 14″ which merge into a downturned lip 15 of the hood cap. Thus the cap is supported and sustained above the mouth nozzle to form a discharge channel, whereby the water entering the cup is deflected downwardly before it is finally delivered about the lip flange 15. The hood cap thus forms a protector to prevent clogging of the pipe and, owing to the crowned bottom portion 13, any chaff or sediment will be deflected to the flat portions of the cup bottom to thus insure the mouth of the cup being free from any foreign matter.

While we have shown and described the cup-supporting posts arranged preferably in alternate pairs between the stalls, it is obvious that we may, without departing from the spirit of our invention, use a single offset supporting post for the cup, and we may also position a cup between each set of stanchion members in some instances, in lieu of placing them alternately. It is preferable, however, to position them between alternate pairs for the sake of economy, under which conditions one cup would be sufficient capacity to supply the wants of the companion animals.

From the foregoing description it is obvious, as shown in Fig. 4, that a cup so positioned with relation to the manger will not form an obstruction, nor will it utilize space to the detriment of the free movement of the animal in any direction, it being observed that its position is such that the animal will swing its head in a natural movement to drink and the rearwardly bowed bars will prevent further swing of the animal's head, nor can said animal back rearward in order to have access to the trough due to the fact that the post serves as a fender to insure said animal assuming the proper position for drinking.

We claim:

1. The combination of a stall having a manger sill and an overhead stanchion supporting bar, a post connecting the supporting bar and manger, the post being provided with an intermediate rearwardly disposed bowed portion, and a cup secured to said rearwardly disposed bowed portion.

2. The combination of a series of stalls having a manger, an overhead supporting bar, stanchion members connecting the overhead bar and manger sill, parallel posts extending from the sill portion of the manger to the overhead bar intermediate of the stanchions, the posts being provided with an intermediate rearwardly disposed bowed portion, and a cup fitted to said bowed portion whereby said cup is positioned rearwardly of the manger.

3. The combination of a stall having a manger, an overhead supporting bar alined with the manger sill, and stanchions carried by said bar, with a pair of supporting posts intermediate of the stanchions, said pair being bowed rearwardly relative to the manger, and a cup detachably secured to the bowed portion of the posts whereby the latter is positioned clear of the manger between a companion pair of stanchions.

4. A stall equipment comprising a post having an outwardly bowed portion forming a bucket seat and a bucket provided with fastening means for engaging the post to retain the bucket to the seat.

In testimony that we claim the foregoing we have hereunto set our hands at Watertown in the county of Jefferson and State of Wisconsin in the presence of two witnesses.

FREDERICK W. MOLDENHAUER.
SIDNEY E. JONES.

Witnesses:
FRED ALBRECHT,
LEONARD TRIPLETT.

Copies of this patent may be obtained for five cents each, by addressing the "Commissioner of Patents, Washington, D. C."